(12) United States Patent
Corem et al.

(10) Patent No.: US 7,940,465 B2
(45) Date of Patent: May 10, 2011

(54) COLLIMATOR ARRAY

(75) Inventors: Yossi Corem, Beit Shemesh (IL); Gil Cohen, Livingston, NJ (US); Boris Frenkel, Jerusalem (IL)

(73) Assignee: Oclaro (New Jersey), Inc., Denville, NJ (US)

( * ) Notice: Subject to any disclaimer, the term of this patent is extended or adjusted under 35 U.S.C. 154(b) by 0 days.

(21) Appl. No.: 11/882,459

(22) Filed: Aug. 1, 2007

(65) Prior Publication Data

US 2008/0030867 A1 Feb. 7, 2008

Related U.S. Application Data

(60) Provisional application No. 60/834,734, filed on Aug. 1, 2006.

(51) Int. Cl.
*G02B 27/30* (2006.01)
(52) U.S. Cl. ........................... 359/641; 359/619
(58) Field of Classification Search ............ 359/641
See application file for complete search history.

(56) References Cited

U.S. PATENT DOCUMENTS

| | | | |
|---|---|---|---|
| 6,868,206 B2 * | 3/2005 | Martin et al. | 385/33 |
| 7,306,376 B2 * | 12/2007 | Scerbak et al. | 385/76 |
| 2003/0043472 A1 * | 3/2003 | Mandella | 359/641 |
| 2003/0128437 A1 * | 7/2003 | Sato et al. | 359/641 |
| 2003/0142909 A1 * | 7/2003 | Suzuki et al. | 385/33 |
| 2007/0172174 A1 * | 7/2007 | Scerbak et al. | 385/76 |

* cited by examiner

*Primary Examiner* — Jordan M. Schwartz
*Assistant Examiner* — James C Jones
(74) *Attorney, Agent, or Firm* — Patterson & Sheridan, L.L.P.

(57) ABSTRACT

A collimator array using a molded element to hold the input fibers and to collimate the light. The input fibers are held within holes in one face of the element, and the collimation of the light emitted from the ends of the fibers is performed by an array of lenses appropriately located such that each lens collimates the light emitted from a fiber end. The lateral spacing between the holes is made to be equal to the lateral spacing between the lenses of the array. Since, in a molded element, this lateral spacing can be accurately provided, good alignment of the input fibers with the lenses can be achieved. The depths of the holes can be made such that when a fiber is inserted right to the bottom of a hole, the end of that fiber is accurately located such that the light emitted therefrom is collimated by the lens. This avoids the need for accurate manual alignment of the fibers of the array. Alternatively, the hole can be made slightly deeper than this predetermined depth, to provide some adjustment in the lens-fiber distance for adjusting the level of collimation.

9 Claims, 5 Drawing Sheets

COLLIMATOR ARRAY

This application claims priority from U.S. Provisional Patent Application Ser. No. 60/834,734 filed on Aug. 1, 2006, and which is incorporated herein by reference in its entirety.

FIELD OF THE INVENTION

The present invention relates to the field of fiber optical collimator arrays, especially for use in optical communication applications.

BACKGROUND OF THE INVENTION

Commonly found prior art collimator arrays, as typically shown in FIG. 1, generally use an input fiber array 10 and a lens array 12 constructed from separate elements, and mechanically aligned opposite each other, so that the light from each fiber impinges centrally on its associated lens. The fiber array itself commonly comprises a silicon V-groove mechanical structure 14 with a single mode, bare fiber 16, typically with a diameter of 125 µm, aligned and clamped by means of a cover plate inside each V-groove. Both V-groove structure 14 and lens array 12 are mounted on a base plate 18. The accuracy of spacing between the fibers is generally no better than ±0.5 µm, and due to the nature of the assembly process and the production spread of fiber diameter, often not even that good. Additionally, the silicon array itself can have mechanical deformations that too affect the fiber position accuracy.

The lens array is generally made of either silicon or glass, and it too has limited positional accuracy. Furthermore, the lenses themselves may have deviations in the radius of curvature arising from the manufacturing process.

An additional and often the major source of inaccuracy arises from the process of aligning and assembling the two elements, the input fiber array and the lens array, which is a challenging task requiring much effort and time. Some alignment errors, such as lateral misalignment of the two parts, can be compensated for elsewhere in the system, since the collimated array of light beams are still coplanar. However, an angular twisting misalignment between the two elements results in a three dimensional fanning out of the array of collimated light beams, and this cannot be compensated for, such that the total device performance is degraded.

There therefore exists a need for a collimator array which overcomes some of the disadvantages of such prior art arrays.

SUMMARY OF THE INVENTION

The present invention seeks to provide a new collimator array which overcomes at least some of the disadvantages of prior art arrays. The collimator array is preferably constructed of a solid block of a transparent material, with the lens array and fiber alignment holes formed integrally in the block, such that their mutual positions are predetermined and fixed. An integral lens array is formed within the transparent material along one side of the block and an array of holes for receiving fibers is formed in a location that ensures that the light issuing from each fiber is directed to its associated lens. The fibers are inserted into the holes, whose depth ensures that the end of the fiber is located in the correct position for optimum focusing. The element is preferably made by a molding process, which can provide highly accurate and generally identical parts. Although the cost of production of a mold may be substantial, the cost of the parts can be significantly less than of a similar prior art assembled array, provided that sufficient units are manufactured from one mold.

According to a first preferred embodiment, the array of holes for the fibers is located at the opposite side of the block to the lens array, such that the light passes directly by transmission from the fiber ends to the lenses. According to another preferred embodiment, the array of holes for the fibers is located on the same side of the block as the lens array, and an opposite face of the block is used as a reflective element, such that the light passes by reflection from the fiber ends to the lenses.

A particular advantage of the present invention over prior art collimator arrays becomes apparent if the element is made by molding, since both the lens and the fiber hole arrays are formed in a single element with the same mold, such that the accuracy of alignment is determined by the accuracy of the mold, which can be significantly higher than the mechanical aligning procedures used in prior art assembled arrays. Furthermore, due to the small distances between each fiber hole and its associated lens, the relative alignment accuracy of each channel is much better than the total accuracy of the part, which may have an accumulated accuracy drift across its width. However, it is to be understood that the monolithic block structure of the collimator array of the present invention may also have advantages over prior art assembled collimator arrays, even if the collimator block is manufactured by some other process, such as precision single-point machining, or for micro-arrays, by microelectronic machining methods, and this application is to be understood to cover collimator arrays blocks as manufactured by any such methods, and not just by molding. However, the cost advantage may be lost using methods other than molding.

There is thus provided in accordance with a preferred embodiment of the present invention, a collimator array comprising:
(i) a block of a transparent optical medium, the block comprising:
(ii) an array of holes adapted to receive the ends of an array of optical fibers, and
(iii) an array of lenses adapted to collimate light emitted from the ends of the optical fibers and impinging on the lenses,
wherein the array of holes and the array of lenses are generally located such that the lateral spacing between adjacent ones of the lenses is the same as the lateral spacing between adjacent ones of the holes, and successive ones of the array of lenses are generally aligned to receive light emitted from fibers inserted into successive ones of the array of holes.

In the above described collimator array, the array of holes may preferably be formed in a first surface of the block, and the array of lenses formed in a second surface of the block, the first surface being disposed opposite the second surface, such that light from ends of the optical fibers is transmitted directly to the lenses. Alternatively and preferably, the array of holes may be formed in a first surface of the block, and the array of lenses formed in a second surface of the block, the first surface being disposed at an angle to the second surface, and wherein the block also comprises a third reflective surface disposed such that light from ends of the optical fibers is transmitted by reflection in the third surface to the lenses.

There is further provided in accordance with yet another preferred embodiment of the present invention, a collimator array as described above, and wherein the array of holes and the array of lenses are formed in a first surface of the block, and wherein the block also comprises a second reflective surface disposed opposite the first surface, the holes being disposed at an angle such that such that light from ends of the optical fibers is transmitted by reflection in the second surface to the lenses.

In any of the above-described collimator arrays, the depths of the holes are preferably arranged such that the optical distance between the end of a hole and the lens associated therewith is such that when a fiber is inserted to the end of the hole, the lens associated with the hole collimates light emitted from the end of the fiber and falling on the lens. In such cases, the optical distance between the end of the hole and the lens associated therewith is preferably made equal to the focal length of the lens. Alternatively and preferably, the depths of the holes may generally be arranged such that the optical distance between the end of a hole and the lens associated therewith is less than the focal length of the lens, such that the longitudinal position of the end of the fiber within the hole can be adjusted to adjust the collimation provided.

In any of the above described collimator arrays, the block is preferably formed of a molding of the transparent optical medium. In such a case, the transparent optical medium may be any one of a moldable optical glass and a moldable optical plastic.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 2:
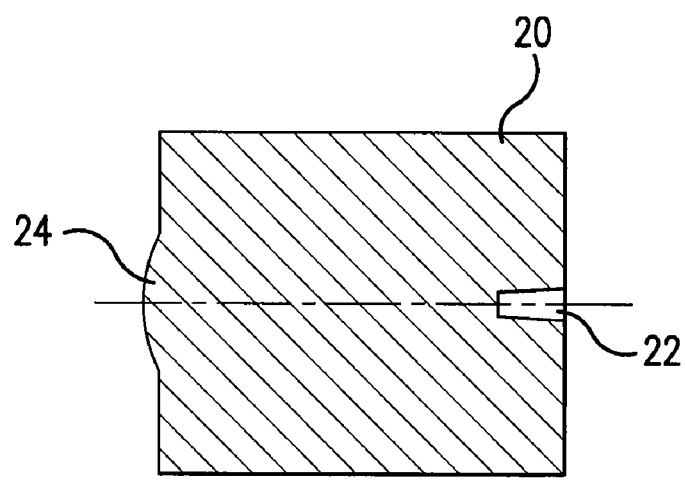
FIG. 2 is a schematic cross sectional illustration of a single channel of a transmissive collimator array according to one embodiment of the present invention.

Reference is now made to FIG. 2 which illustrates schematically a cross sectional view of a transmissive collimator array according to one embodiment of the present invention, showing a single channel. The collimator transparent block 20 of this single channel preferably has a hole 22 into which the bare fiber is inserted, and a lens 24 aligned exactly opposite the lens.

Figure 3:
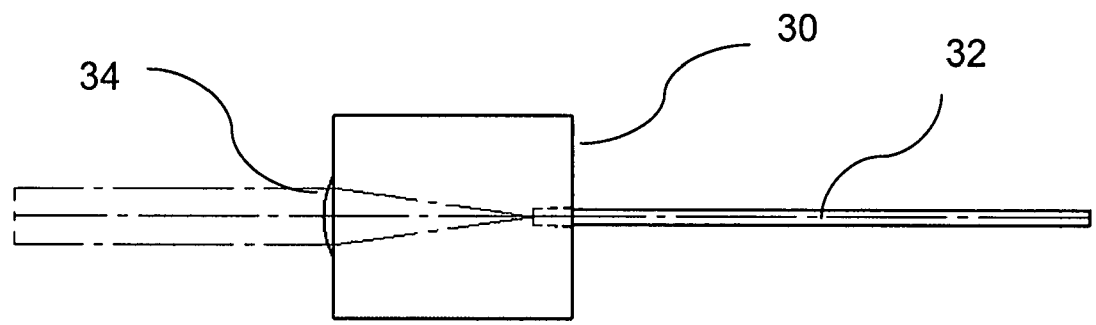
FIG. 3 illustrates the single channel of the collimator array of FIG. 2 with an input fiber 32 attached.

Reference is now made to FIG. 3 which illustrates the single channel of the collimator array of FIG. 2 with an input fiber 32 attached. The depth of the hole in the collimator block 30 is arranged to be such that, when the fiber 32 is pushed to the bottom of the hole, the distance of the fiber end from the lens, taking into account the refractive index of the material of the device, is such that a collimated beam is output from the lens 34. Alternatively and preferably, since there may still be some element of inaccuracy even in a precision molded part, whether in dimensions or, more likely, in refractive index variation, it may be advantageous to arrange the geometry of the component such that the hole is slightly deeper than described hereinabove, such that the bottom of the hole is closer to the lens than the focal plane of the lens. The end of the fiber does not then have to be at the bottom of the hole to ensure perfect collimation, and its position can be adjusted during assembly to ensure optimum collimation. Although this does not have the advantage of a simple assembly technique, the performance may be improved by use of this degree of focal adjustment.

Figure 1:
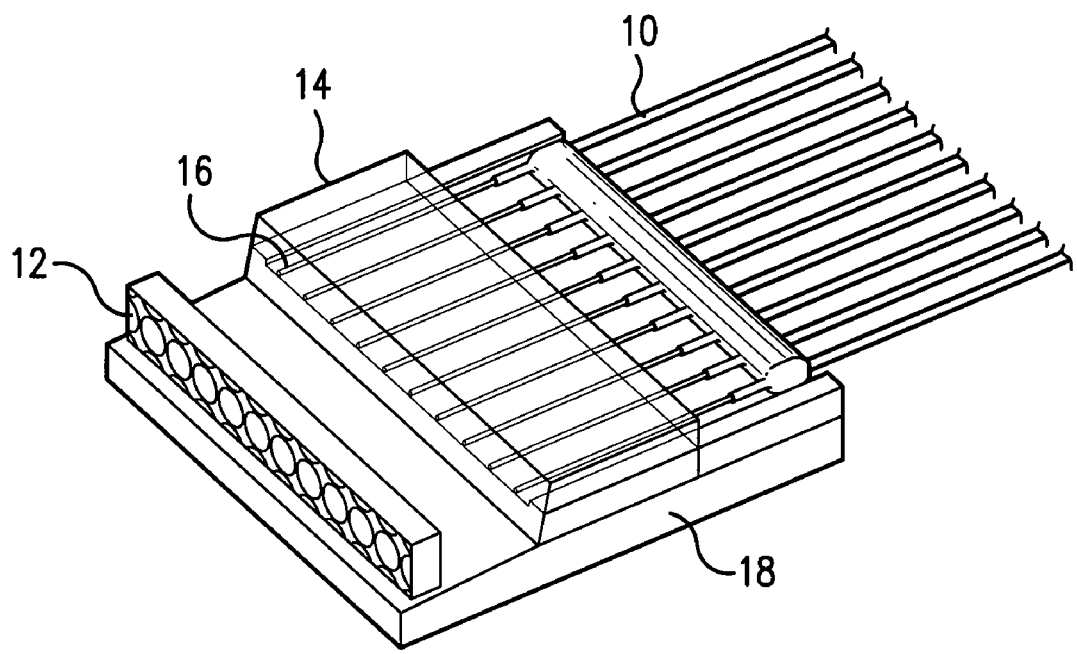
FIG. 1 illustrates a commonly found prior art collimator array.
Figure 4:
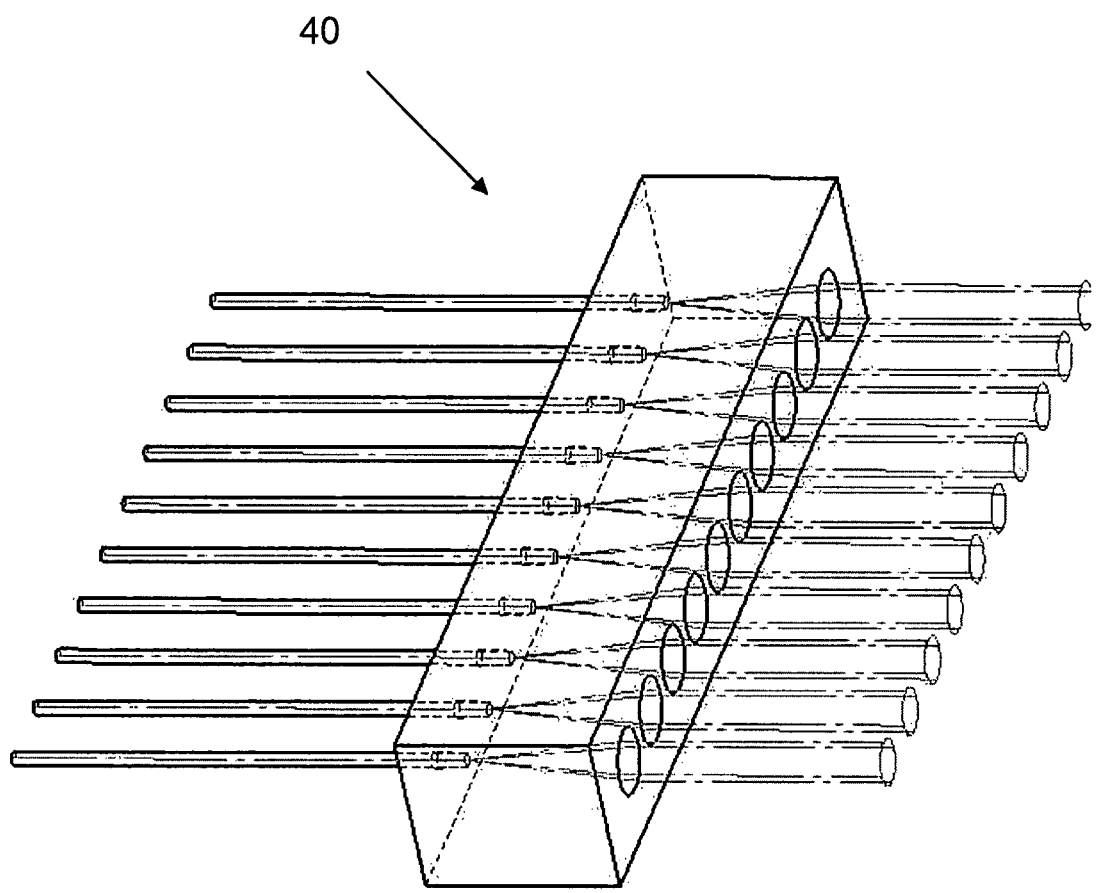
FIG. 4 is a schematic isometric drawing of a complete transmissive collimator array according to a preferred embodiment of the present invention.

Reference is now made to FIG. 4 which is a schematic isometric drawing of a complete collimator array 40, according to a preferred embodiment of the present invention. Some sort of mechanical clamping mechanism is required to hold the fibers in place within their holes. However, unlike the prior art collimator array shown in FIG. 1, the mechanical clamping is required only to attach the fiber array to the collimator array, while the exact optical position of each fiber is determined by the holes in the collimator block, and not by the clamping method. The mechanical clamping could preferably be achieved simply by means of an applied adhesive. In this case the adhesive, does determine the focal position of the fiber in those embodiments where the hole depth is adapted to enable such a focusing adjustment.

Figure 5:
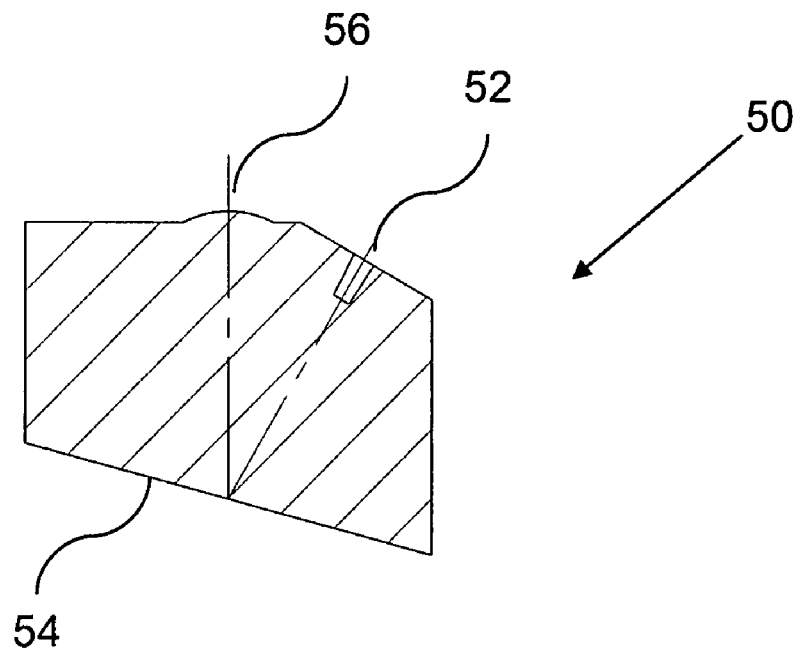
FIG. 5 illustrates schematically a cross sectional view of a reflective collimator array, according to another preferred embodiment of the present invention.

Reference is now made to FIG. 5 which illustrates schematically a cross sectional view of a reflective collimator array 50, according to another preferred embodiment of the present invention, showing a single channel of the array. The hole 52 into which the bare fiber is inserted is shown aligned at such an angle that light from the fiber end is reflected from the opposite face 54 of the block, and is directed onto the lens 56 with high accuracy. The opposite face of the element 54 should have a high reflectivity surface, which can preferably be provided by an optical coating. The advantage of this reflective embodiment over the transmissive one previously described in FIGS. 2 to 4 is that both of the operative elements of the device, the holes 52 and the lenses 56 are manufactured on the same side of the device, and close to each other, such that the alignment accuracy is improved. This is a result of the simpler structure of a one-sided mold, in comparison with a mold for the two sided embodiment. A two sided mold is generally made of two halves which need to be joined, and the accuracy of the joining process may lead to a loss of accuracy of the molded device made using the mold.

Figure 6:
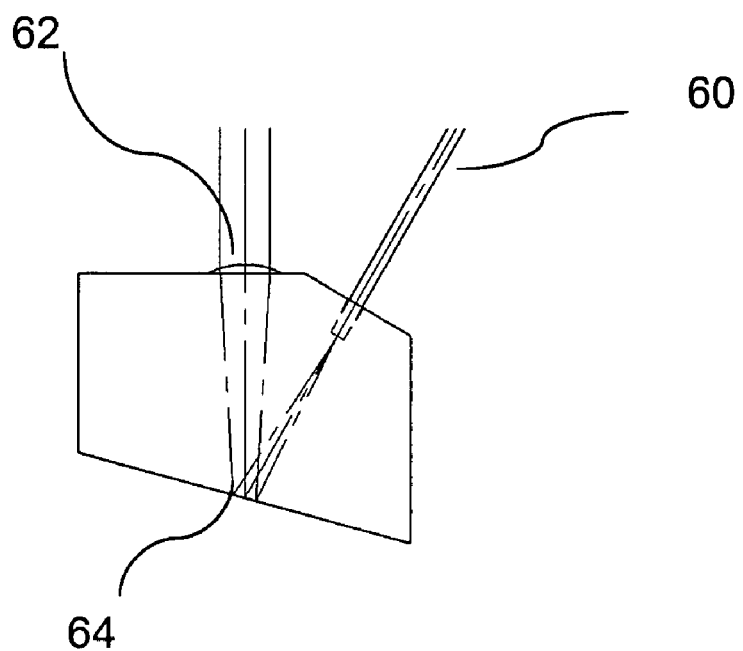
FIG. 6 shows a fiber inserted into position in a hole of the collimator block of the embodiment of FIG. 5.

FIG. 6 shows a fiber 60 inserted into position in a hole of the collimator block of the embodiment of FIG. 5, with the light from its end being collimated by the lens 62, after reflection from the reflective surface 64.

Figure 7:
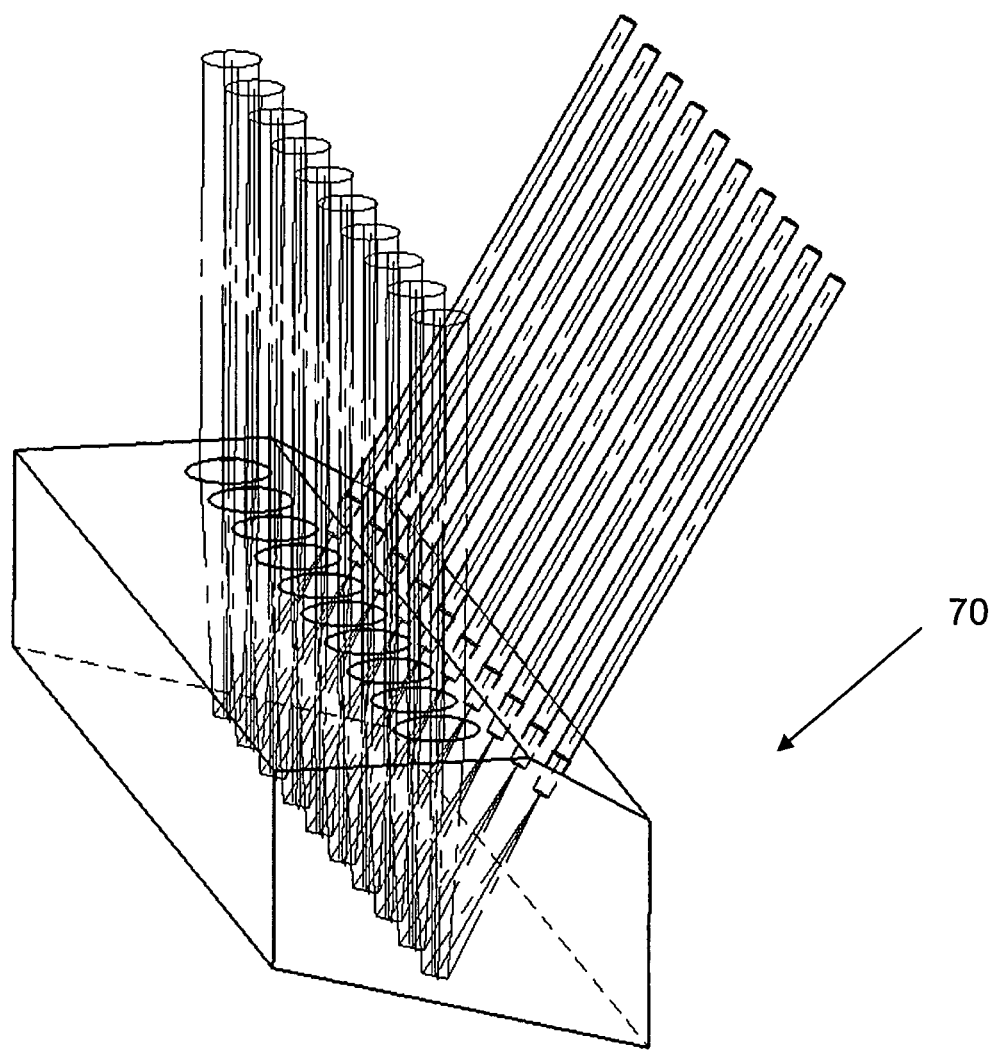
FIG. 7 is a schematic isometric drawing of a complete reflective collimator array, according to the preferred embodiment of the present invention.

FIG. 7 is a schematic isometric drawing of a complete reflective collimator array 70, according to the preferred embodiment using the block geometry of FIGS. 5 and 6.

Figure 8:
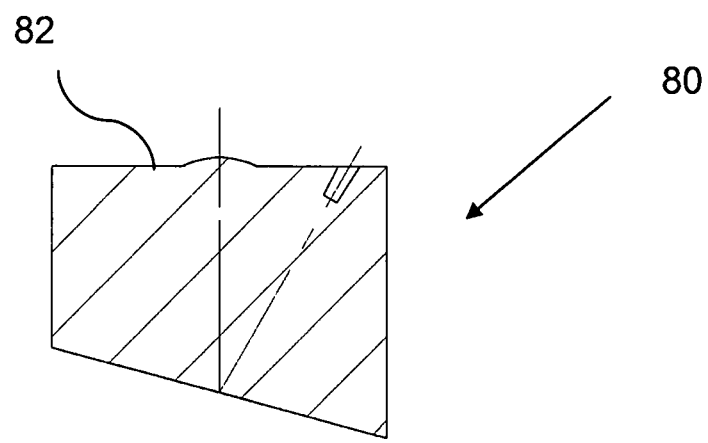
FIGS. 8 to 10 respectively show various views, similar to those of FIGS. 5 to 7, of another preferred embodiment of a reflective collimator array, but having a block geometry different from that of FIGS. 5 to 7.
Figure 9:
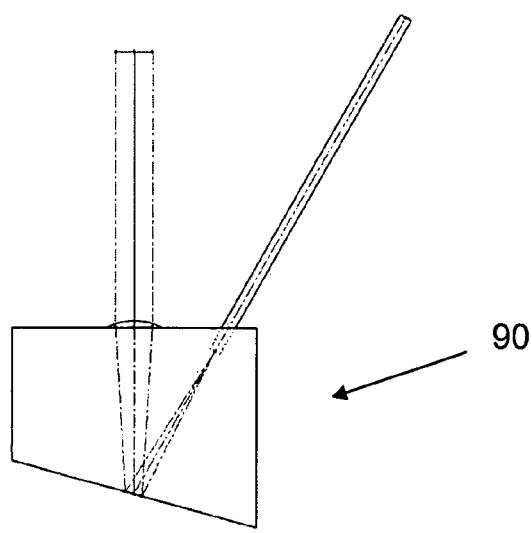
Figure 10:
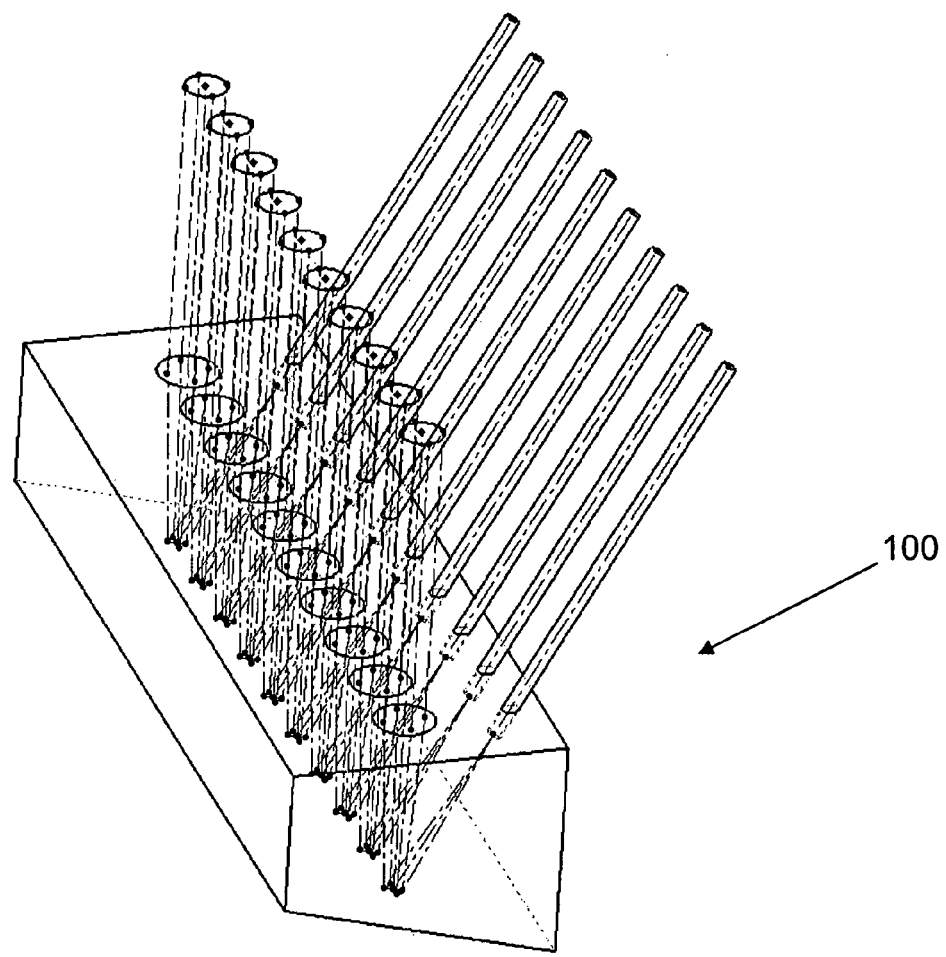

In the preferred embodiment of FIGS. 5 to 7, the fiber holes and the lenses are formed on two different surfaces angled so as to provide normal incidence of the fiber into its receiving surface, and normal exit of the collimated light from the surface carrying the lenses. This arrangement may simplify fiber array attachment and output path interface. However, it is to be understood that the lens and the fiber hole can equally well be formed on one plane surface 82 of the collimator block, so long as they are angled correctly relative to the reflective surface opposite. Several views of the construction and use of such a preferred embodiment is shown in FIGS. 8 to 10, which respectively show the cross-sectional shape of the block 80, the optical path from an input fiber to the collimating lens output 90, and a schematic isometric view of a complete reflective collimator array 100, using this geometry.

If the body of the collimator array of the present invention is made by a molding process, the block material may preferably comprise a molding glass, such as B270 supplied by SCHOTT North America Inc., of Elmsford N.Y., or F-LAH81 or S-LAH60 supplied by the Ohara Corporation, of Somerville, N.J. The glass should be such that it has a similar coefficient of expansion to that of the fused silica of the fiber. Alternatively and preferably, the element can be constructed of an optical molding plastic material.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A collimator array comprising:
   an integral, monolithic block of a transparent optical medium, said block comprising:
   an array of holes formed in said block and adapted to receive the ends of an array of optical fibers; and
   an array of lenses formed in said block and adapted to collimate light emitted from the ends of optical fibers inserted into said holes, and impinging on said lenses;
   wherein said array of holes and said array of lenses are located such that the lateral spacing between adjacent ones of said lenses is the same as the lateral spacing between adjacent ones of said holes, and successive ones of said array of lenses are aligned to receive light emitted from fibers inserted into successive ones of said array of holes.

2. A collimator array according to claim 1 and wherein said array of holes is formed in a first surface of said block, and said array of lenses is formed in a second surface of said block, said first surface being disposed opposite said second surface, such that light from ends of said optical fibers is transmitted directly to said lenses.

3. A collimator array according to claim 1 and wherein said array of holes are formed in a first surface of said block, and said array of lenses is formed in a second surface of said block, said first surface being disposed at an angle to said second surface, and wherein said block also comprises a third reflective surface disposed such that light from ends of said optical fibers is transmitted by reflection in said third surface to said lenses.

4. A collimator array according to claim 1 and wherein said array of holes and said array of lenses are formed in a first surface of said block, and wherein said block also comprises a second reflective surface disposed opposite said first surface, said holes being disposed at an angle such that such that light from ends of said optical fibers is transmitted by reflection in said second surface to said lenses.

5. A collimator array according to claim 1, and wherein the depths of said holes are arranged such that the optical distance between the end of a hole and the lens associated therewith is such that when a fiber is inserted to the end of said hole, said lens associated with said hole collimates light emitted from the end of said fiber and falling on said lens.

6. A collimator array according to claim 5 and wherein said optical distance between the end of said hole and the lens associated therewith is equal to the focal length of said lens.

7. A collimator array according to claim 1, and wherein the depths of said holes are arranged such that the optical distance between the end of a hole and the lens associated therewith is less than the focal length of said lens, such that the longitudinal position of the end of said fiber within said hole can be adjusted to adjust the collimation provided.

8. A collimator array according to claim 1, and wherein said block is formed of a molding of said transparent optical medium.

9. A collimator array according to claim 8, and wherein said transparent optical medium is either one of a moldable optical glass and a moldable optical plastic.

* * * * *